United States Patent
Bhandal et al.

(10) Patent No.: US 6,532,533 B1
(45) Date of Patent: Mar. 11, 2003

(54) INPUT/OUTPUT SYSTEM WITH MASK REGISTER BIT CONTROL OF MEMORY MAPPED ACCESS TO INDIVIDUAL INPUT/OUTPUT PINS

(75) Inventors: Amarjit S. Bhandal, Northants (GB); Graham Short, Bedford (GB); Richard Simpson, Bedford (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/450,889

(22) Filed: Nov. 29, 1999

(51) Int. Cl.[7] ............................................. G06F 13/20
(52) U.S. Cl. ........................ 712/225; 712/32; 712/38; 711/163
(58) Field of Search ........................ 712/225, 38, 32; 711/163

(56) References Cited

U.S. PATENT DOCUMENTS 5,713,006 A * 1/1998 Shigeeda .................... 710/8
5,901,328 A * 5/1999 Ooe ............................. 710/5
5,923,894 A * 7/1999 Sollars ...................... 710/100

* cited by examiner

*Primary Examiner*—Richard L. Ellis
*Assistant Examiner*—Tonia L. Meonske
(74) *Attorney, Agent, or Firm*—Robert D. Marshall, Jr.; W. James Brady, III; Frederick J. Telecky, Jr.

(57) ABSTRACT

A processing device (10) provides general-purpose input/output pins (52) for use by software routines as needed. A data input register (54) has bits corresponding to each pin (52) for storing the value of the signal on the pin. A data output register (56) has bits corresponding to each pin for driving the signal on the pin (52) to a desired value. An output enable register (58) controls output buffers (62) coupled between the output register (56) and the pins (52). A plurality of mask registers (60) may be individually set to define a set a pins associated with the mask. Each of the data registers, the data input register (56), the data output register (58) and the output enable register (60) are accessed through a plurality of addresses, where the address specifies both the data register being accessed and an associated mask register (60). Logic (50) accesses the data registers in view of the state of the associated mask register (60).

12 Claims, 6 Drawing Sheets

MASK REGISTER

| Bit | 31 30 29 28 27 26 25 24 23 22 21 20 19 18 17 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | reserved | msk15 | msk14 | msk13 | msk12 | msk11 | msk10 | msk9 | msk8 | msk7 | msk6 | msk5 | msk4 | msk3 | msk2 | msk1 | msk0 |
| Reset Value | 00000000 00000000 | 0 | 0 | 0 | 0 | 0 | 0 | 0 | 0 | 0 | 0 | 0 | 0 | 0 | 0 | 0 | 0 |
| Type | r | rw | rw | rw | rw | rw | rw | rw | rw | rw | rw | rw | rw | rw | rw | rw | rw |

FIG. 5b

DATA INPUT REGISTER

| Bit | 31 30 29 28 27 26 25 24 23 22 21 20 19 18 17 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | reserved | din15 | din14 | din13 | din12 | din11 | din10 | din9 | din8 | din7 | din6 | din5 | din4 | din3 | din2 | din1 | din0 |
| Reset Value | 00000000 00000000 | x | x | x | x | x | x | x | x | x | x | x | x | x | x | x | x |
| Type | r | r | r | r | r | r | r | r | r | r | r | r | r | r | r | r | r |

FIG. 5c

DATA OUTPUT REGISTER

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | \multicolumn{16}{c|}{reserved} | dout15 | dout14 | dout13 | dout12 | dout11 | dout10 | dout9 | dout8 | dout7 | dout6 | dout5 | dout4 | dout3 | dout2 | dout1 | dout0 |
| Reset Value | \multicolumn{16}{c|}{00000000 00000000} | 0 | 0 | 0 | 0 | 0 | 0 | 0 | 0 | 0 | 0 | 0 | 0 | 0 | 0 | 0 | 0 |
| Type | \multicolumn{16}{c|}{r} | rw | rw | rw | rw | rw | rw | rw | rw | rw | rw | rw | rw | rw | rw | rw | rw |

FIG. 5d

OUTPUT ENABLE REGISTER

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | \multicolumn{16}{c|}{reserved} | oen15 | oen14 | oen13 | oen12 | oen11 | oen10 | oen9 | oen8 | oen7 | oen6 | oen5 | oen4 | oen3 | oen2 | oen1 | oen0 |
| Reset Value | \multicolumn{16}{c|}{00000000 00000000} | 0 | 0 | 0 | 0 | 0 | 0 | 0 | 0 | 0 | 0 | 0 | 0 | 0 | 0 | 0 | 0 |
| Type | \multicolumn{16}{c|}{r} | rw | rw | rw | rw | rw | rw | rw | rw | rw | rw | rw | rw | rw | rw | rw | rw |

INPUT/OUTPUT SYSTEM WITH MASK REGISTER BIT CONTROL OF MEMORY MAPPED ACCESS TO INDIVIDUAL INPUT/OUTPUT PINS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to processing devices and, more particularly, to a general-purpose input/output subsystem.

2. Description of the Related Art

General-purpose processing devices, which may include microprocessing units (MPUs), digital signal processors (DSPs) and other devices, allow a single device to be used in many different applications. The processing device is customized to the desired application through programming. A single processing device may be used to execute multiple programs, separately or concurrently. The order in which applications are executed may change dynamically during operation of the processing device.

Many processing devices include general-purpose input/output (I/O) pins, which may be used by the programmers to interface the processing device to other devices. These I/O pins may be used as needed in a particular application. For example, a processing device used in a cellular phone may designate a first group of pins to connect to a modem circuit and a second group of pins to connect to an LCD screen controller. In another application these same pins could be for very different purposes.

In the prior art, the general-purpose I/O pins have been coupled to a I/O register that stores a value associated with each pin in a respective bit position of the register. To read pin signals for a certain function, the processor reads the value of the register and the processing device masks the bits not associated with the function. To send signals to pins for a certain function, the processor, to avoid changing bits not associated with the function, must perform a read-modify-write operation. The processor reads the value of the output buffer associated with the general-purpose I/O pins, modifies only those bits associated with the function at hand, and re-writes the modified value to the output buffer. This scheme of providing general-purpose I/O pins can use a significant amount of processing time and power, and requires tedious and scrupulous programming to operate the I/O pins correctly.

Another significant concern involves the use of the general-purpose I/O pins in a multi-tasking environment, where multiple independent tasks access the I/O register. In this case, the read-modify-write operation must be atomic, i.e., the entire operation must be completed before another operation begins. Otherwise, the following scenario could occur: (1) a first task performs a read-modify-write in order to write data to pins 0–3 of the general-purpose I/O pins, (2) second task interrupts the first task, after the read but before the write, and performs a read-modify-write to pins 4–6 of the general-purpose I/O pins, and (3) after completion of the second task's read-modify-write, the first task regains control and finishes its read-modify-write. In this case, the data for driving pins 4–6 would be overwritten by the write operation of the first task's read-modify-write. In order to prevent this situation from occurring, it is necessary to disable all interrupts to the processing core during the read-modify-write; disabling interrupts to the processing core can create unnecessary latencies in the operation of the device.

Accordingly, a need has arisen for general input/output pins in a processing device which can be easily programmed and which do not hamper processor performance.

BRIEF SUMMARY OF THE INVENTION

In the present invention, a processing device includes a plurality of mask registers, with each mask register having a plurality of bits. A plurality of input/output pins correspond to respective bits of each mask register. One or more data registers are coupled to the input/output pins, each of the data registers have a plurality of bits corresponding to respective bits of each mask register. Logic circuitry accesses the data registers only at locations defined by a selected one of said mask registers.

The present invention provides significant advantages over the prior art. The mask registers and logic allow the processing core to read and write information to the data registers associated with the general purpose I/O pins with a simple read or write command, without becoming involved in performing a read-modify-write operation. Further, the invention eliminates the possibility of errors due to interrupts of a read-modify-write operation. Also, the programming for reading and writing data to the pins is significantly simplified over the prior art and is less prone to error.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–5 of the drawings, like numerals being used for like elements of the various drawings.

Figure 1:
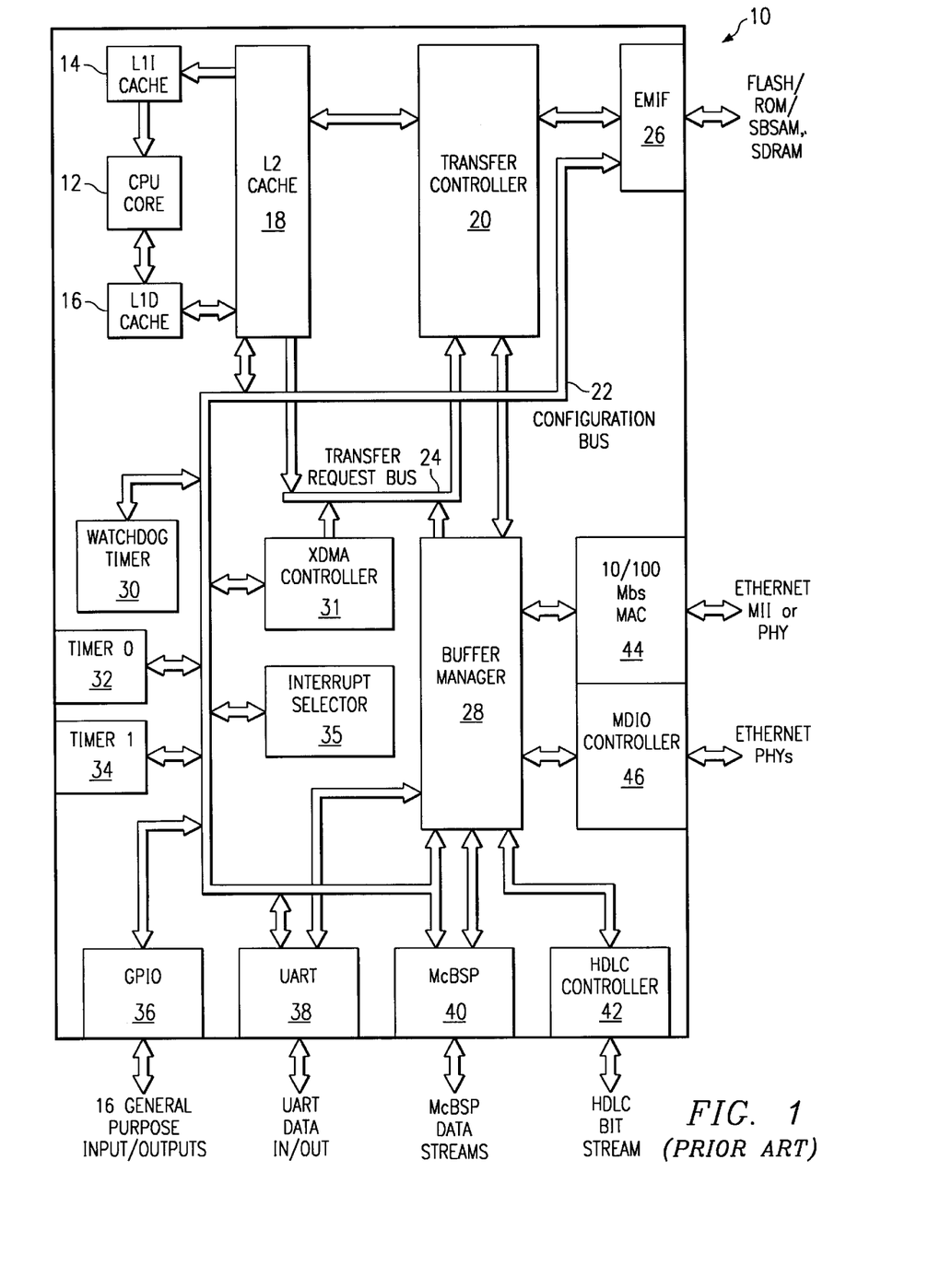
FIG. 1 is a block diagram of a processing device incorporating general-purpose input/output circuitry.

FIG. 1 illustrates a block diagram of a processing device 10 that uses the flexible general-purpose input/output structure of the present invention. It should be noted that, for purposes of illustration, the block diagram of the processing device 10 is a specific implementation of a DSP and that the present invention could be used in conjunction with processor structures that are significantly different than the one shown in FIG. 1. It is contemplated that the invention could be used in the design of any processing device where general purpose pins are provided, including, but not limited to, microprocessors, digital signal processors, mixed analog/digital signal processors and coprocessors.

In the example of FIG. 1, the processing device 10 includes a CPU (processing) core 12 that is coupled to a level 1 (L1I) instruction cache 14 and a level 1 (L1D) data cache 16. L1I cache 14 and L1D cache 16 are coupled to a level 2 (L2) cache 18. L2 cache 18 is coupled to transfer controller 20, configuration bus 22 and transfer request bus 24. Transfer controller 20 is also coupled to EMIF (External Memory Interface) 26 and buffer manager 28. Configuration bus 22 is coupled to EMIF 26, watchdog timer 30, XDMA (external direct memory access) controller 31, timer0 32, timer1 34, interrupt selector 35, GPIO (general-purpose input/output) circuitry 36, UART (universal asynchronous receive/transmit) 38, McBSP (multi-channel buffered serial port) 40, and buffer manager 28. Buffer Manager 28 is also coupled to UART 38, McBSP 40, an HDLC (high-level data link) controller 42, and MAC (media access controller) 44 and MDIO (serial MII management direct input/output) controller 46. Transfer request bus 24 is coupled to the L2 cache 18, transfer controller 20, buffer manager 28 and XDMA controller 31.

In operation, the device can be divided into a set of data input/output units (MAC 44, McBSP 40, UART 38, HDLC Controller 42, GPIO 36, MDIO 46), data manipulation and processing unit (CPU core 12), data movement and storage units (L1 and L2 Caches 14, 16 and 18, Transfer Controller 20, Buffer Manager 28, EMIF 26) and support units (XDMA Controller 31, Interrupt Selector 35, Timer0 32, Timer1 34, Watchdog Timer 30). The combination of Transfer Controller 20 and XDMA controller 31 is known as the Enhanced DMA (EDMA).

In the embodiment described herein, all device components share a memory space accessed by a 32-bit address bus. The top half of this space, address range 0x80000000–0xFFFFFFFF is divided into four separate spaces of up to 128M bytes, each implemented in external memory devices accessed via the EMIF 26. The bottom half, address range 0x00000000–0x7FFFFFFF, is internally mapped. This address range also breaks down into a number of spaces. The device interface and support components are memory-mapped into these internal address spaces. Data movement between any locations across the whole memory space is undertaken by the Transfer Controller 20, following requests from the Buffer Manager 28, L2 Cache 18 and/or XDMA Controller 31 received over the Transfer Request Bus 24. In addition, the area of memory extending over the address range 0x01800000–0x01FFFFFF is accessed on behalf of the CPU core 12 via the Configuration Bus 22. This configuration bus space is primarily for accessing registers used for system control and configuration. The data and instruction needs of the CPU core 12 are served by a two level cache arrangement comprising of separate first level instruction and data caches (L1 Instruction Cache 14 and L1 Data Cache 16, respectively) and a unified second level cache (L2 Cache) 18.

The processing device 10 provides a number of external interfaces comprised of an Ethernet MAC interface 44 able to operate at 10 or 100 Mbps, a universal asynchronous receive/transmit (UART) interface 38 which can be set to all the common baud rates up to 167 k, _a multi-channel buffered serial port (McBSP) interface 40, a high-level data link control (HDLC) interface 42, a serial MII management (MDIO) interface 46, sixteen general-purpose input/output (GPIO) pins for the connection of other external devices including external processor core interrupt sources and for control signals for the two internal timers 32 and 4.

Internal resources include two 32-bit timers 32 and 34 which can be used for a variety of counting and timing purposes, an interrupt selector 35 through which all device events which can cause CPU interrupts are handled, an XDMA controller 31, which is activated by incoming events, in a similar manner to the CPU reacting to interrupt events, but instead of jumping to an interrupt service routine, the XDMA controller 31 reacts by posting one of a selection of pre-defined data transfer requests to the Transfer Controller 20. Additionally the Buffer Manager 28 constitutes a major internal resource. This unit is the means by which the MAC 44, HDLC controller 42, McBSP 40 and UART 38 transfer packetized data in and out of device memory space. It provides dedicated hardware for transporting data between itself and the peripherals it serves, building the data into lists of packets (known as data queues) and for using the Transfer Controller 20 to transfer the data queues to/from external memory from where the CPU core 12 can access and manipulate the data as required by the application.

As described in greater detail hereinbelow, a number (sixteen in the illustrated embodiment) of general-purpose I/O pins are provided. Each GPIO pin can be independently set as an input or an output. The GPIO pins are driven or monitored by reading and writing to a set of memory mapped registers. In the illustrated embodiment, the GPIO registers are memory mapped to the address space of the configuration bus 22.

Figure 2:
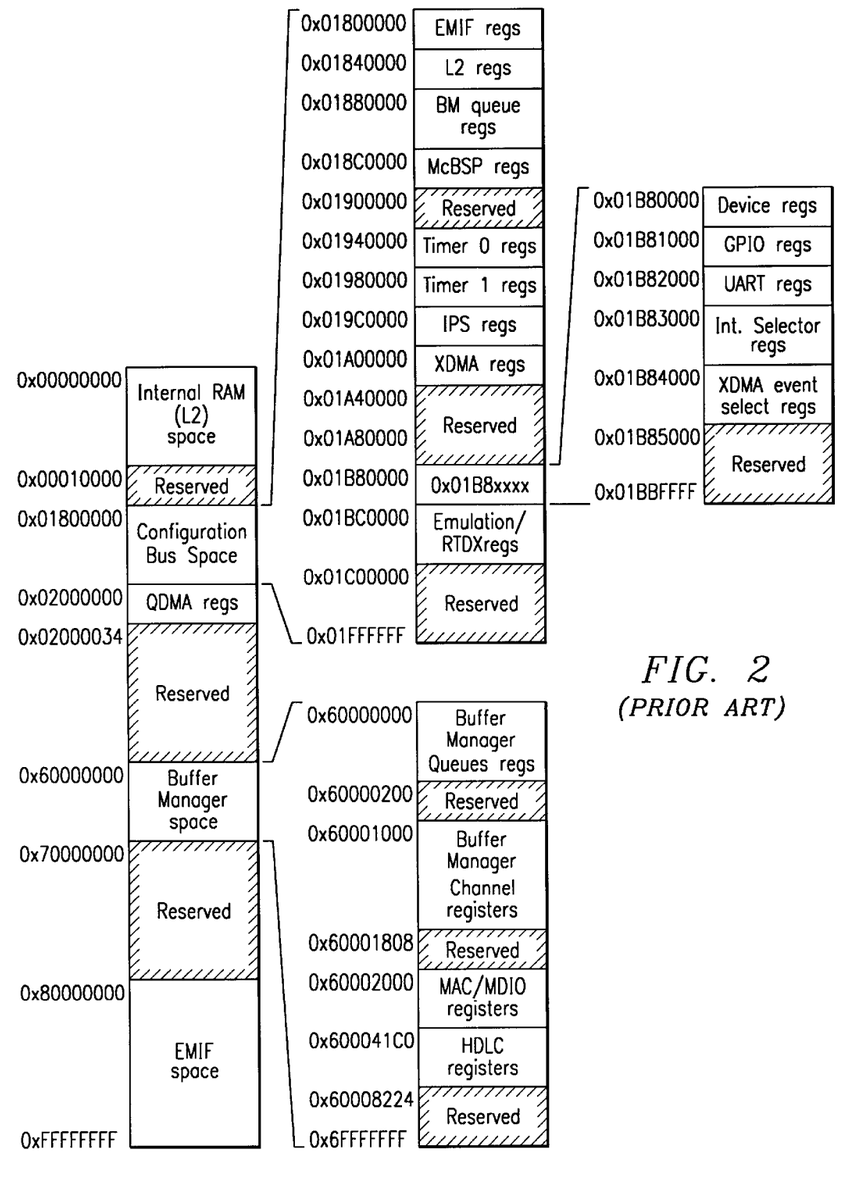
FIG. 2 illustrates an exemplary memory map for the processing device of FIG. 1.

FIG. 2 illustrates an exemplary memory map for the processing device 10. In the illustrated embodiment, the processing device uses a single unified memory map; however, this is not necessary to practice the present invention. In the embodiment shown, the configuration bus address space has an address space from 0x01800000 (all addresses in hex notation) to 0x01FFFFFF. Within the configuration bus address space, the GPIO uses the address space from 0x01B81000 to 0x01B81FFF. The GPIO address space could be mapped, however, into any convenient portion of the address space for the processing device 10.

Figure 3A:
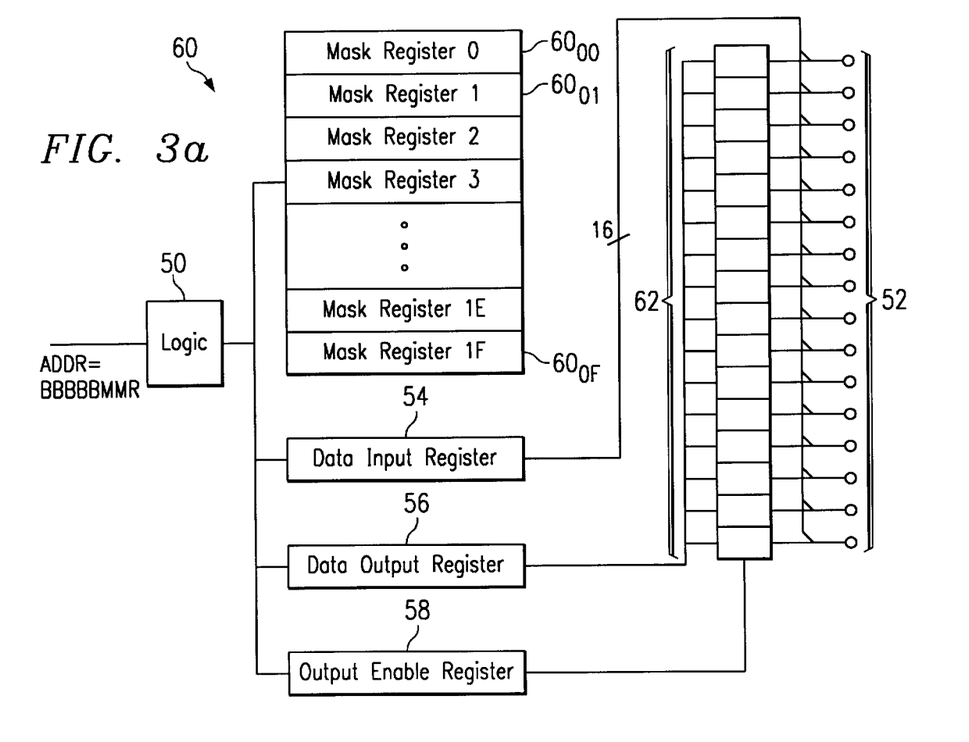
FIG. 3a illustrates a block diagram of the general-purpose input/output circuitry from a physical perspective.

FIG. 3a illustrates a basic physical block diagram of the GPIO circuitry. Logic 50 receives read and write requests to the GPIO 36 for the range (in the illustrated embodiment of FIG. 2) from 0x01B81000 to 0x001B81FFF. This address is represented generally in FIG. 3a as BBBBBMMR, where BBBBB is a "base" field, MM is a "mask" field and R is a "register" field. Hence, logic 50 receives read and write requests for addresses where the base address BBBBB=01B81. For a configuration providing sixteen general-purpose I/O pins 52, the GPIO hardware 36 includes a 16-bit data input register 54 (one bit for each pin 52), a 16-bit data output register 56, a 16-bit data enable register 58 and, in the illustrated embodiment, thirty-two 16-bit mask registers 60 (individually referenced as mask registers $60_0$–$60_{1F}$). Each of the sixteen bits of the data input register 54 is coupled to a corresponding pin 52. Each bit of the output enable register 58 is coupled to the control gate of a corresponding tri-state buffer 62. Each bit of the data output register 56 is coupled to the input of a corresponding buffer 62. The outputs of the tri-state buffers 62 are coupled to pins 52.

For the mask registers 60, data input register 54, data output register 56, and output enable register 58, there is a direct correspondence between the register bits and the pins 52. The data input register 54 stores the state of the GPIO pins 52 at their last sample point. The data output register 56 defines the data to be driven onto those pins 52 for which the output enable register bit is set in the output enable register 58. The data output register 56 controls the tri-state buffers and thus defines what data is being driven out to the pins 52 from data output register 56.

For convenience, each of the registers described herein is implemented in a thirty-two bit register, where only the low order sixteen bits are used. The implementation shown herein could be easily scaled to provide additional GPIO pins by using additional bits in the registers.

Figure 3B:
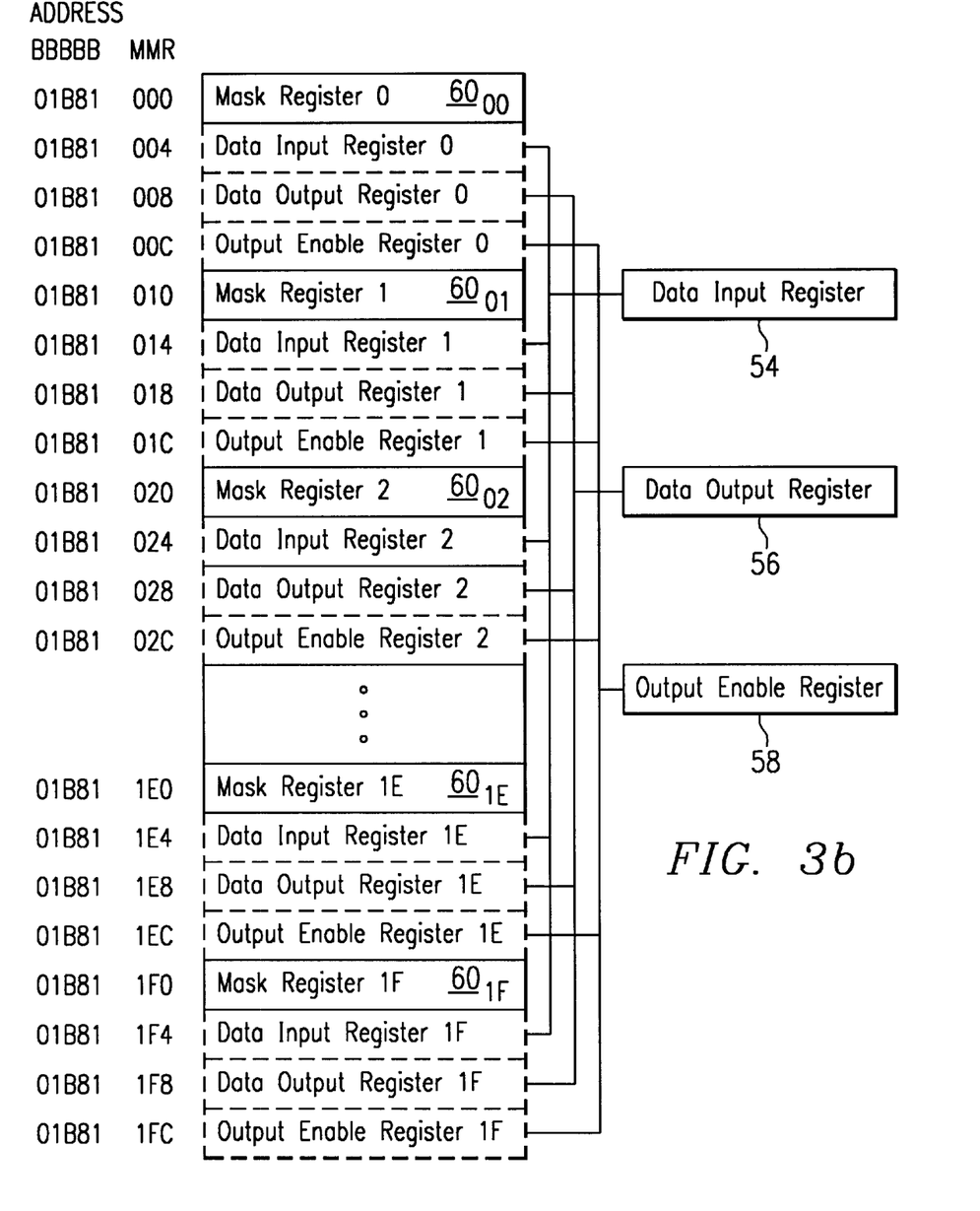
FIG. 3b illustrates a block diagram of the general-purpose input/output circuitry from a logical perspective.

FIG. 3b illustrates a logical diagram of the GPIO circuitry 36. Each of the registers 54, 56, 58, and 60 is memory-mapped to GPIO address space. Whereas, in the preferred embodiment, the mask registers 60 are uniquely mapped to the address space (i.e., each mask register 60 is accessed through a single address), the data input register 54, data output register 56 and output enable register 58 are mapped thirty-two times (once for each mask register 60) into the address space. Hence, the data input register 54 can be read by accessing any one of multiple addresses, the data output register 56 can be written to by accessing any one of multiple addresses and the output enable register 58 can be read from or written to by accessing any one of multiple addresses. While the illustrated embodiment shows an implementation using thirty-two mask registers 60, any number of mask registers could be used, with the number of logical mappings to the data input register 54, data output register 56 and output enable register 58 equal to the number of mask registers.

In the illustrated embodiment, the mask field of the address (MM) uniquely defines a set of (logical) registers associated with a given mask. Hence, for MM=00, R=0 corresponds to mask registers $60_0$, R=4 corresponds to a logical data input registers, R=8 corresponds to a logical data output register0 and R=C corresponds to a logical output enable registers. Similarly, for MM=1F, R=0 corresponds to mask register1F $60_{1F}$, R=4 corresponds to a logical data input register1F, R=8 corresponds to a logical data output register1F and R=C corresponds to a logical output enable register1F. Logical Data input register0 and logical data input register1F, for example, are the same physical data input register 54, as shown in FIG. 3a; however, the address used to access each of the multiple-mapped registers 54, 56 and 58, defines how the register is accessed, by identifying the associated mask register 60.

In operation, when a multiple-mapped register is accessed, only those bits that are enabled in corresponding bits of the associated mask register 60 are affected by the operation. Each mask register 60 and its associated (logical) data input 54, data output 56 and output enable 58 registers constitute a GPIO mask register set. When a particular data input, data output or output enable register location is accessed, the bits within the corresponding hardware register affected by the access are determined by the mask register 60 within the same set as the accessed location. When the register being accessed is the data input register 54, data output register 56 or output enable register 58, logic 50 reads accesses the register in accordance with the state of the mask register 60 corresponding to the address used to access the register. The data input register 54, data output register 56 or output enable register 58 is accessed such that only the appropriate bits (corresponding to the bits set in the associated mask register 60) are affected. For a read operation by the processing core 12, logic 50 returns the correct hardware register value only for those bits for which the corresponding mask bits are set; the other bits will return a "0". For a write operation by the processing core 12, logic 50 writes directly to those bits in the register that have a corresponding set mask bit; bits in the register that do not have a corresponding set mask bit are unaffected by the write operation.

This arrangement of accessing registers allows the GPIO interface to be configured so that multiple software processes can access different GPIO pins 52 independently of each other. A task using one or more of the GPIO pins 52, need only set up a mask register defining which pins are used; thereafter, it can access the pins using simple read and write commands to an appropriate address (based on the data register being accessed and the associated mask registers). Programming is thus greatly simplified. Further, since the logic 50 writes to the data register via hardware, rather than the CPU core 12 writing to the data register via software, the core 12 can be interrupted, even as the logic 50 is performing write, without danger of overwriting data from a different task.

Figure 4:
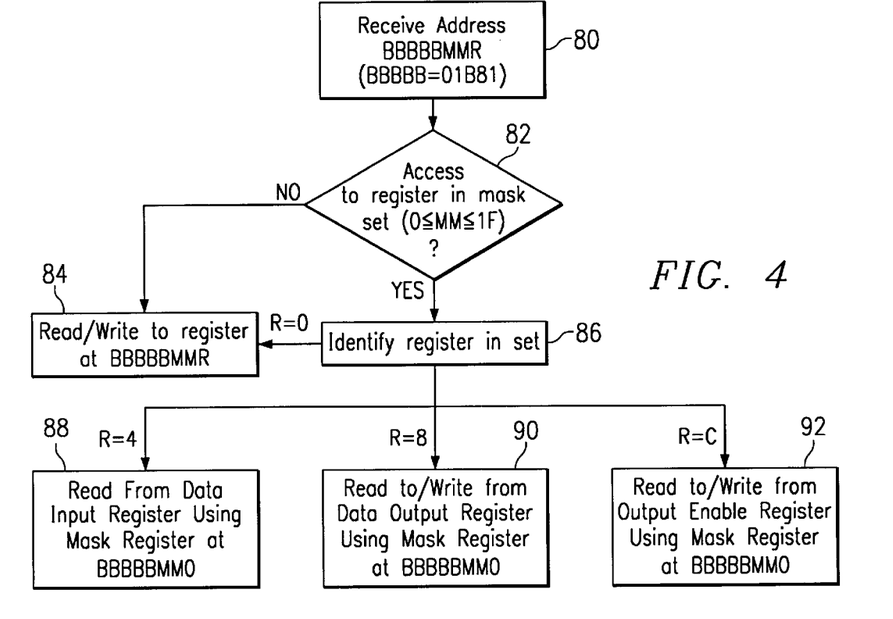
FIG. 4 illustrates a flow diagram describing the operation of the general-purpose input/output circuitry.
Figure 5A:
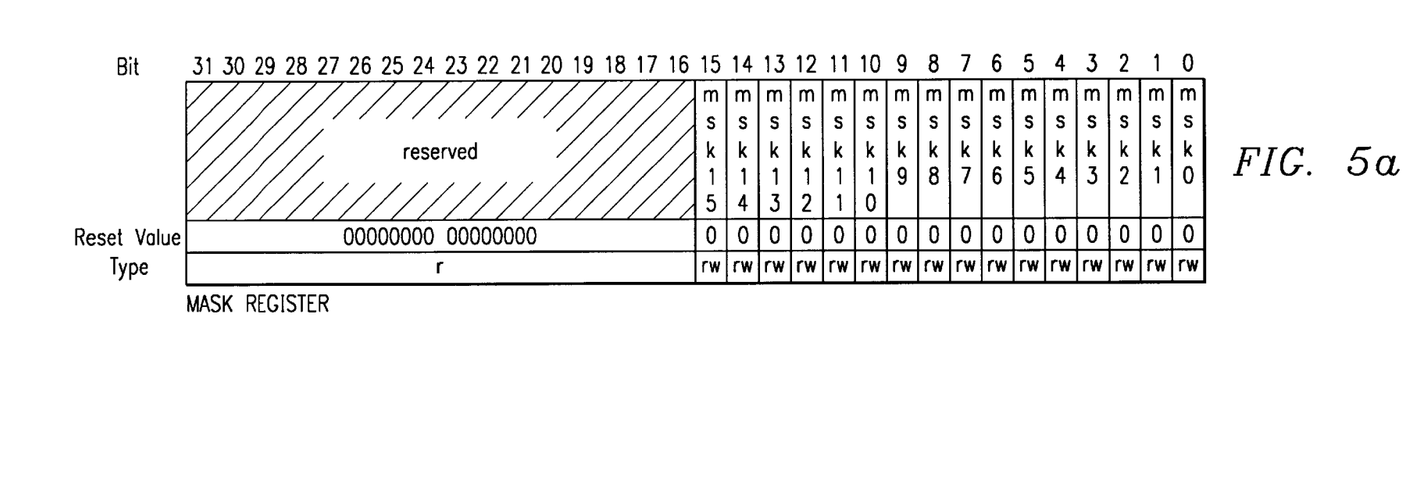
FIGS. 5a, 5b, 5c, and 5d illustrate detailed diagrams of the mask registers, data input register, data output register and output enable register, respectively.
Figure 5B:
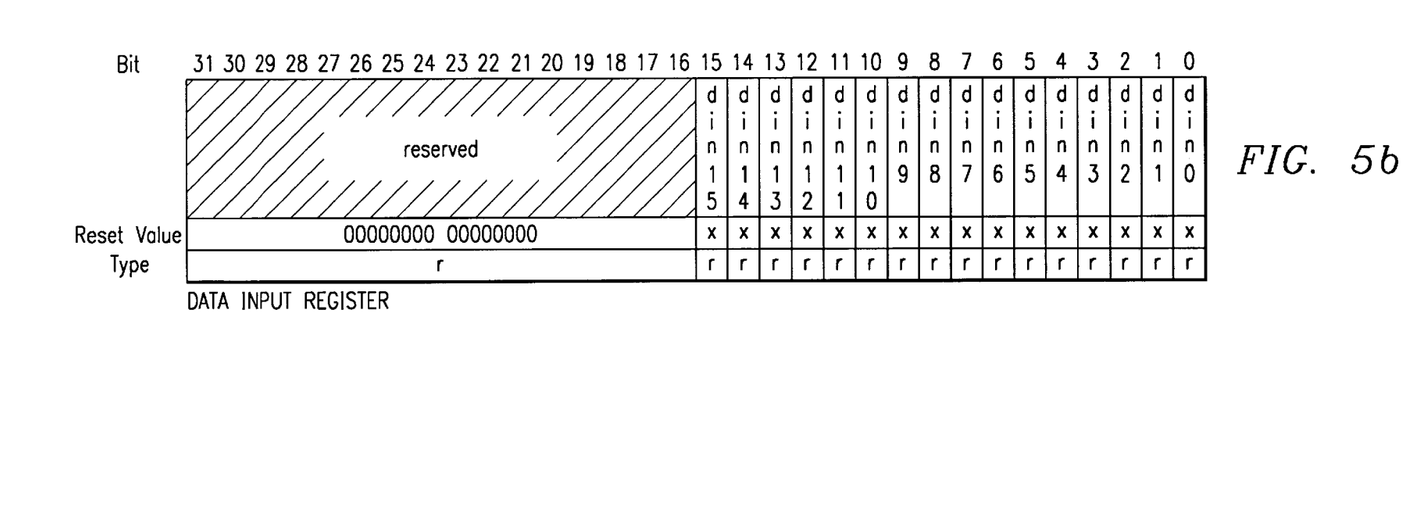
Figure 5C:
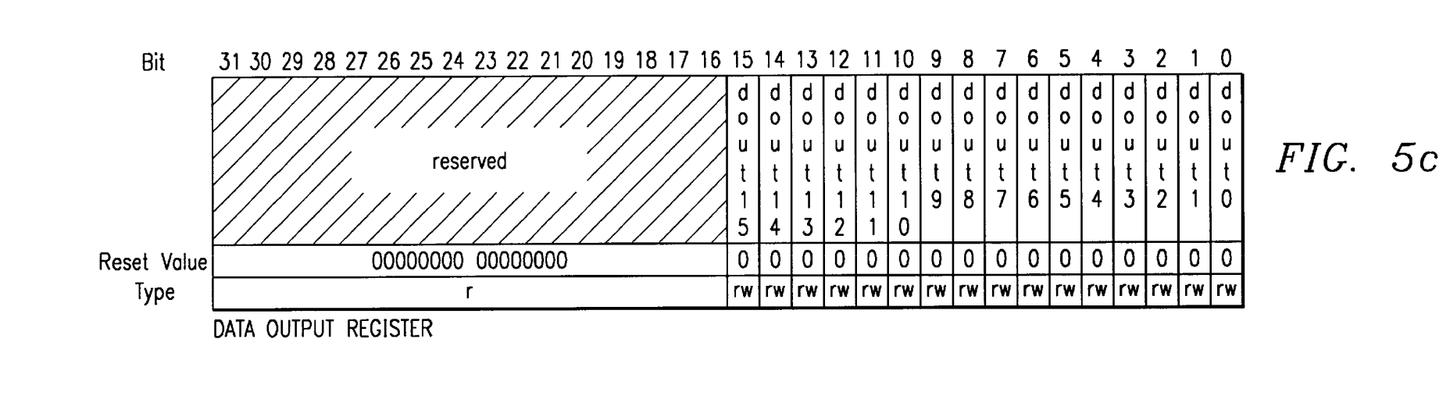
Figure 5D:
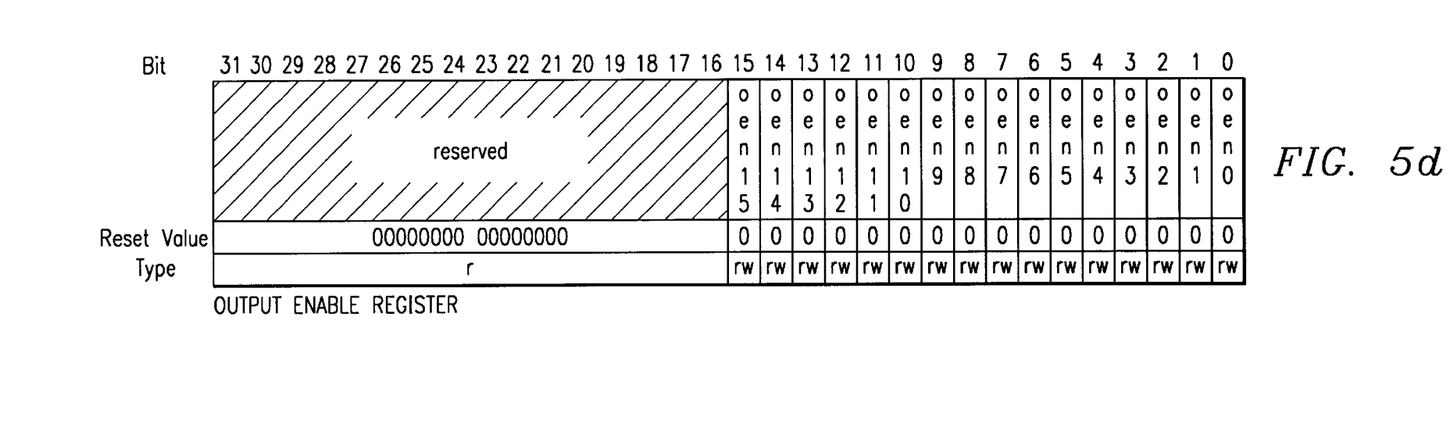

FIG. 4 illustrates a flow diagram showing operation of the GPIO circuitry 36 shown in FIGS. 3a and 3b. In block 80, an address is received by logic 50 in conjunction with a read or write request. Only those addresses with a base address BBBBB=01B81 (for the illustrated embodiment) are directed to the GPIO circuitry 36. If the mask field is between 0 and 1F (i.e., 0<=MM<=1F) in decision block 82, the request is directed to one of the registers in a mask register set. Accesses to addresses outside this mask field range are processed normally in block 84. If the access is to a data register in a mask set, the register is identified in block 86. Accesses to a mask register 60 (R=0) are processed normally; data is read from or written to the mask register in block 84.

In block 88, if the register being accessed is the data input register 54 (R=4), only those bits for which the associated mask register bit is set will return the correct hardware register value, the other bits will return a 0. The data input register 54 is read-only. In block 90, if the register being accessed is the data output register 56 (R=8) and the access is a read, data will be returned only for those bits which have the corresponding mask register bit set, the other bits will return a "0". For a write operation to the data output register 56, the write data will be written only to the hardware register bits for which the corresponding mask bit is set; the other bits of the data output register 56 will remain unaffected. In block 92, if the data register being accessed is the output enable register 58 (R=C), data will be read from this register only for those bits which have the corresponding mask bit set, the other bits will return a "0". For a write operation to the output enable register 58, the write data will only be written to the hardware register bits for which the corresponding mask bit is set; the other bits will remain unaffected.

FIGS. 5a through 5d illustrate detailed organization of the mask registers 60, data input register 54, data output register 56, and output enable register 58. The operation of each register is set forth in Tables I though Table IV, respectively.

TABLE I

Mask Register Definition

| Bit | Name | Function |
|---|---|---|
| 31 through 16 | Reserved | Reserved. Writes to these bits have no effect. They always read as zero. |
| 15 through 0 | msk15 thru msk0 | Mask bits. Set bit mskx to 1 to enable access to the associated mask register set's dinx, doutx and oenx bits. |

TABLE II

Data Input Register Definition

| Bit | Name | Function |
|---|---|---|
| 31 through 16 | Reserved | Reserved. Writes to these bits have no effect. They always read as zero. |
| 15 through 0 | din15 thru din0 | Data In bits. Returns the data on the GPIO pins. When read, register bit x returns the value on GPIO pin x if the associated mask register's mskx bit is set, otherwise register bit x returns 0. Writes have no effect to this register. |

TABLE III

Data Output Register Definition

| Bit | Name | Function |
|---|---|---|
| 31 through 16 | Reserved | Reserved. Writes to these bits have no effect. They always read as zero. |
| 15 through 0 | dout15 thru dout0 | Data Out bits. Defines the data to be written out on the GPIO pins. When read, bit x returns doutx if the associated mask register's mskx bit is set, otherwise bit x of the read data is set to 0. When written, bit x of the write data is written to register bit doutx if the associated mask register's mskx bit is set, otherwise doutx is left unaffected. |

TABLE IV

Data Output Register Definition

| Bit | Name | Function |
|---|---|---|
| 31 through 16 | Reserved | Reserved. Writes to these bits have no effect. They always read as zero. |
| 15 through 0 | oen15 thru oen0 | Output Enable bits. Enables the driving of data from the GPIO data output register onto the GPIO pins. When read, bit x returns oenx if the associated mask register's mskx bit is set, otherwise bit x of the read data returns is set to 0. When written, bit x of the write data is written to register bit oenx which the associated mask register's mskx bit is set, otherwise oenx is left unaffected. If oenx = 1, GPIO pin x is driven with the value in doutx. |

In operation, each software routine executed by the processor 10 can set up one or more mask registers 60 to define the pins 52 monitored or driven by the routine. For example, if a routine accesses pins 3–0 as an input/output port to a certain device, a value of "0 . . . 01111" could be written to mask0. All access to this port would be made using the data input register 54 accessed through address 0x1B81004, the data output register 56 accessed through address 0x1B81008 and the output enable register accessed through address 0x1B8100C. After setting the mask register 60$_0$, the software routine need not be concerned with uses of the other general-purpose pins, since writes to the pins defined by the mask do not affect the use of the pins disabled by the mask register.

The present invention provides significant advantages over the prior art. Thus, a simple write command by the processing core 12 initiates a hardware write by logic 50 to the specified bits of the accessed register, the specified bits being set forth in an associated mask register 60 defined by the write address. The write by logic 50 is transparent to the core 12, thereby simplifying coding of a task, and is not subject to errors caused by interrupts.

Although the Detailed Description of the invention has been directed to certain exemplary embodiments, various modifications of these embodiments, as well as alternative embodiments, will be suggested to those skilled in the art. For example, the addresses, sizes of registers, number of mask registers (and logical data input, data output and output enable registers) and number of pins shown herein are to illustrate a specific embodiment; variations can easily be made to these factors as would be known to one skilled in the art. Likewise, the mask sets shown herein are comprised of four registers (mask, data input, data output, and output enable); however, certain implementations could increase or decrease the number of registers in each mask set as needed to provide a desired functionality. The invention encompasses any modifications or alternative embodiments that fall within the scope of the Claims.

What is claimed is:

1. A processing device comprising:

a plurality of mask registers, each mask register having a plurality of bits;

a plurality of input/output pins corresponding to respective bits of each mask register;

one or more data registers coupled to said input/output pins, each of said data registers having a plurality of bits corresponding to respective bits of each mask register, each data register having a memory mapped address corresponding to each mask register; and logic circuitry for accessing said data registers via said memory mapped addresses, whereby upon memory mapped access to one of said data registers access to a bit of said data register is permitted if said corresponding bit of said mask register corresponding to said memory mapped address has a first digital state and access to a bit of said data register is prohibited if said corresponding bit of said mask register corresponding to said memory mapped address has a second digital state opposite to said first digital state.

2. The processing device of claim 1 wherein:

said one or more data registers include a data input register for storing values corresponding to signals applied to said input/output pins; and upon a read access of said data input register via one of said memory mapped addresses said logic circuit returns a state of a bit of said data input register where said corresponding bit of said mask register corresponding to said memory mapped address has said first digital state and returns "0" where said corresponding bit of said mask register corresponding to said memory mapped address has said second digital state.

3. The processing device of claim 1 wherein:

said one or more data registers include a data output register for storing values to be applied to said input/output pins; and upon a write access of said data output register via one of said memory mapped addresses said logic circuit writes a state of a bit of write data to a corresponding bit of said data output register where said corresponding bit of said mask register corresponding to said memory mapped address has said first digital state and leaves a bit of said data output register unchanged where said corresponding bit of said mask register corresponding to said memory mapped address has said second digital state.

4. The processing device of claim 3 wherein said one or more data registers include an output enable register for storing values corresponding to a signal applied to buffers coupled between said data output register and said input/output pins.

5. A method of controlling a set of input/output pins in a processor including a processing core and one or more data registers having a plurality of bits coupled to respective pins, comprising the steps of:

defining a memory mapped address for each of a plurality of data registers and for each of a plurality of mask registers;

receiving a memory mapped access request directed to one of said data registers from the processing core;

identifying an associated one of a plurality of mask registers via said memory mapped address;

enabling access to said one of said data registers at bit locations where a corresponding bit of said associated mask register has a first digital state; and prohibiting access to said one data register at bit locations where said corresponding bit of said associated mask register has a second digital state opposite to said first digital state.

6. The method of claim 5 wherein:

said receiving step comprises the step of receiving a read access request directed to a data input register storing values corresponding to signals applied to said input/output pins;

said enabling access step returns a state of a bit of said data input register where said corresponding bit of said associated mask register has said first digital state; and said prohibiting access step returns "0" where said corresponding bit of said associated mask register has said second digital state.

7. The method of claim 5 wherein:

said receiving step comprises the step of receiving a write access request directed to a data output register for storing values to be applied to said input/output pins;

said enabling access step writes a state of a bit of write data to said data output register where said corresponding bit of said associated mask register has said first digital state; and said prohibiting access step leaves a bit of said data output register unchanged where said corresponding bit of said associated mask register has said second digital state.

8. The method of claim 7 further comprising:

disposing a plurality of tri-state output buffers between said data output register and said input/output pins, each tri-state output buffer having an input connected to a corresponding bit of said data output register, an output connected to a corresponding input/output pin and a control input, each tri-state output buffer enabled to supply data at said input to said output if said control input receives a third digital state and disabled from supplying an output if said control input receives a fourth digital state opposite to said third digital state;

supplying said control inputs of said tri-state output with corresponding bits stored in an output enable register;

wherein said receiving step comprises the step of receiving a write access request directed to said output enable register for storing values corresponding to a signal applied to buffers coupled between said data output register and said input/output pins;

said enabling access step writes a state of a bit of write data to said data enable register where said corresponding bit of said associated mask register has said first digital state; and said prohibiting access step leaves a bit of said data enable register unchanged where said corresponding bit of said associated mask register has said second digital state.

9. A processing device comprising:

a set of input/output pins;

a processing core;

one or more data registers having a plurality of bits coupled to respective input/output pins;

a plurality of mask registers;

logic circuitry for:
defining a memory mapped address for each of a plurality of data registers and for each of a plurality of mask registers;

receiving a memory mapped access request directed to one of said data registers from the processing core;

identifying an associated one of a plurality of mask registers via said memory mapped address;

enabling access to said one of said data registers at bit locations where a corresponding bit of said associated mask register has a first digital state; and prohibiting access to said one data register at bit locations where said corresponding bit of said associated mask register has a second digital state opposite to said first digital state.

10. The processing device of claim 9 wherein:

said data registers include a data input register for storing values corresponding to signals applied to said input/output pins; and upon a read access of said data input register via one of said memory mapped addresses said logic circuit:
returning a state of a bit of said data input register where said corresponding bit of said associated mask register has said first digital state; and
returning "0" where said corresponding bit of said associated mask register has said second digital state.

11. The processing device of claim 9 wherein:

said data registers include a data output register for storing values to be applied to said input/output pins; and upon a write access of said data output register via one of said memory mapped addresses said logic circuit:
writing a state of a bit of write data to a corresponding bit of said data output register where said corresponding bit of said associated mask has said first digital state; and
leaving a bit of said data output register unchanged where said corresponding bit of said associated mask register has said second digital state.

12. The processing device of claim 11 further comprising:

a plurality of tri-state output buffers, each tri-state output buffer having an input connected to a corresponding bit of said data output register, an output connected to a corresponding input/output pin and a control input, each tri-state output buffer enabled to supply data at said input to said output if said control input receives a third digital state and disabled from supplying an output if said control input receives a fourth digital state opposite to said third digital state;

wherein said data registers include output enable register for storing values corresponding to a signal applied to respective control inputs of said tri-state output buffers; and upon a write access of said data enable register via one of said memory mapped addresses said logic circuit:

writing a state of a bit of write data to a corresponding bit of said data output register where said corresponding bit of said associated mask register has said first digital state; and leaving a bit of said data enable register unchanged where said corresponding bit of said associated mask register has said second digital state.

* * * * *